July 30, 1929.  R. O. HENDRICKSON  1,722,795
TRACTOR BELT
Filed April 22, 1926
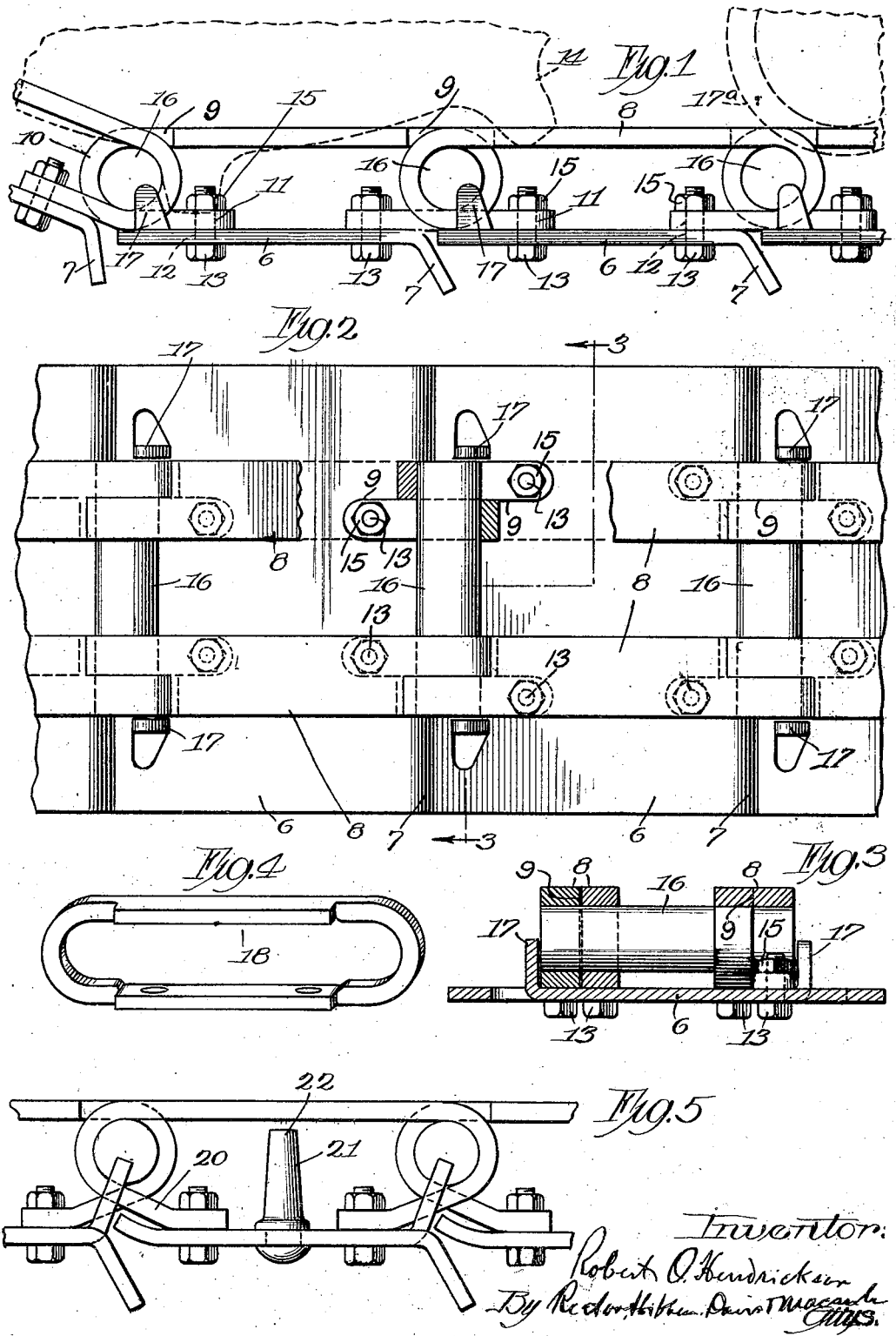
Inventor:
Robert O. Hendrickson Patented July 30, 1929.

1,722,795

UNITED STATES PATENT OFFICE.

ROBERT O. HENDRICKSON, OF RACINE, WISCONSIN.

TRACTOR BELT.

Application filed April 22, 1926. Serial No. 103,998.

My invention relates to tractors of the so-called crawler type in which a pair of belts having ground engaging traction projections are carried respectively on pairs of sprocket wheels on opposite sides of the body of the machine. The object of my invention is to produce a traction belt, capable of withstanding the rough usage to which such traction belts are subjected, which is relatively long-lived and durable and can be manufactured at a relatively low cost. My improved belt is of such construction as to readily free itself from dirt, stone and other material which is liable to lodge in the tractor belts in the use of machines of this character. Furthermore it cushions shocks to which such tractors are subject when traveling thus saving wear and tear on the machine as a whole. Other features of my invention will be apparent from the detailed description hereinafter contained. It is to be understood, however, that the specific disclosure is for the purpose of exemplification only and that the scope of the invention is defined in the claim in which I have endeavored to distinguish it from the prior art as known to me without, however, restricting the invention except as such prior art may require.

In the drawings accompanying and forming a part of the specification, Fig. 1 shows in side elevation a few links of my improved belt and a portion of one of the sprockets by which it is carried, the latter being shown in dotted lines; Fig. 2 is a face or plan view of the same portion of the belt, viewed from above or inside, parts being shown in horizontal section; Fig. 3 is a vertical transverse section through the belt on the broken line 3—3 of Fig. 2; Fig. 4 an isometric view of an element of a slightly modified form of belt and Fig. 5 a side elevation showing a complete link and the ends of adjacent links of another and preferred form of the invention.

Referring first to the form of the invention shown in Figs. 1, 2 and 3, the ground engaging plates 6 are formed from sheet metal of suitable thickness and material, generally rectangular in outline and bent at one end as at 7 to form ground engaging toes. Each plate is provided with a pair of links 8, which cooperate with bolts, pins and similar links on adjacent plates to secure the plates together. These links are conveniently and economically formed of steel straps or strips of suitable thickness, width and resilience by taking sections of suitable length and cutting them away at their respective ends as at 9 so that the end portions of said sections are of approximately half the width of the intermediate body portion. The end portions are then bent back upon the arc of a circle as at 10 toward each other and bored at the ends for the reception of bolts by which they are attached to the plates.

The plates are likewise bored as at 12 for the reception of the bolts 13 by which the links are secured thereto, the holes 12 being so spaced transversely of the plate that when the links are attached to the latter suitable space is left between the links of the pair to receive the teeth 14 of the sprockets. Nuts 15 on the inner ends of the bolts are tightened up against the links after the latter are in place to secure them firmly to the plates and the inner ends of the bolts may be upset or the nuts otherwise locked to prevent turning off.

From an inspection of Fig. 2 it is clear that the plates with the links thereon may be so assembled that the knuckle pins or bolts 16 may be readily inserted to pivot the links and therefore the complete belt units together. The knuckle pins 16 may be sections of cylindrical bars of suitable material and it is necessary only to cut them of the required length and put them in place in the overlapping bands or ends of the pairs of links, no machining or other mechanical treatment being required. In order to hold the pins in place and prevent their slipping out longitudinally, lugs 17 are struck up out of the body of the plate 6, there being two such lugs on each plate located at the respective ends of one of the knuckle bolts 16 by which said plate is attached to its neighbor. The lugs are punched up out of the plate before it is assembled with its links and pins. When thus assembled the lugs prevent the pins from sliding out endways.

The links form a pair of continuous uninterrupted belts or trackways which bear against the truck wheels or rollers by which the weight of the tractor is mainly supported on the belt. In Fig. 1, I have indicated one of said truck wheels or rollers at 17ª. The resilience of the links is such as to cushion shocks occasioned by irregularities in the roadway when the truck wheels or rollers 17ª are at intermediate points in the links.

When a roller is above a knuckle pin there is cushioning effect due to the resilience of the ends of the link between the bolt and knuckle pin.

Since the plates are made of sheet metal, the links of strap metal and the bolt or knuckle pin of sections of cylindrical bar, no machining, forging or the like is required and the resulting structure is economical to manufacture, durable and efficient for the purpose.

In Fig. 4 is illustrated an alternative form of link which may, if desired, be substituted for that above described. In this alternative form the link is continuous and it may be provided with a reinforcing web 18 to strengthen the inner member or leg of the link.

In the form of the invention shown in Fig. 5, the links are in general similar to those shown in Figs. 1 to 3, and similarly attached to the plate. The ends 20 of the links instead of being bent back parallel to the other side thereof are somewhat inclined to the latter, thus providing a somewhat greater resilience. In order to avoid too great a give to the links in passing over unusual irregularities of surface the plates are provided with posts 21 firmly attached thereto, the inner ends of the posts extending nearly to the inner members of the links as at 22. Obviously the depression of the inner member or leg of the link is limited by engagement with the inner end of the post 21. Manifestly such posts could be provided if desired in the form shown in Figs. 1 to 3.

I claim:

In a traction belt of the class described, ground engaging plates, a pair of resilient links secured adjacent their respective ends directly to each plate, the ends of the links of each plate overlapping the ends of the links on adjacent plates, and the inner member of each link being free to move under pressure a limited distance toward the plate, and knuckle bolts extending through the overlapping bends of the links.

In testimony whereof, I have subscribed my name,

ROBERT O. HENDRICKSON.